H. J. MILLER.
RAZOR.
APPLICATION FILED JULY 30, 1910.
995,274.
Patented June 13, 1911.
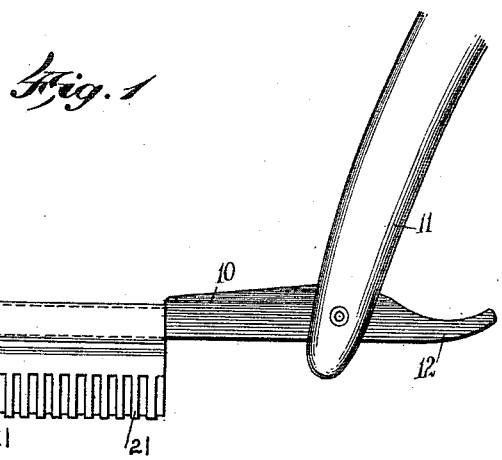
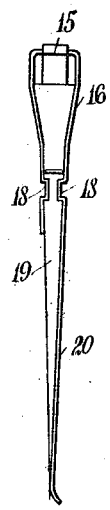
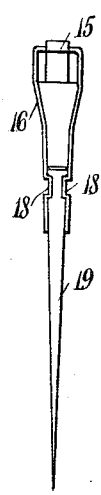
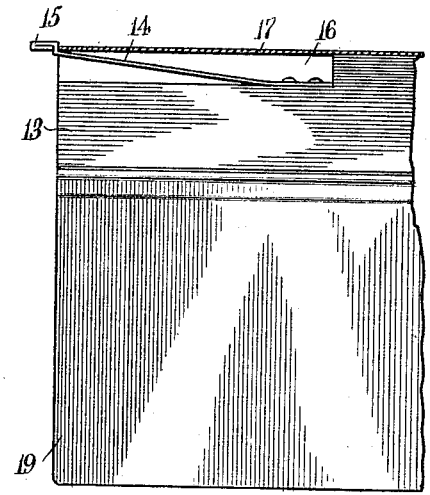
WITNESSES:
INVENTOR
Henry J. Miller
BY
ATTORNEYS

UNITED STATES PATENT OFFICE.

HENRY JOHN MILLER, OF NEW ORLEANS, LOUISIANA.

RAZOR.

995,274.

Specification of Letters Patent. Patented June 13, 1911.

Application filed July 30, 1910. Serial No. 574,658.

*To all whom it may concern:*

Be it known that I, HENRY J. MILLER, a citizen of the United States, and a resident of New Orleans, in the parish of Orleans and State of Louisiana, have invented a new and Improved Razor, of which the following is a full, clear, and exact description.

The invention relates to razors, and has for an object to provide a foldable razor having a blade removable from the shank of the razor, so that a new blade can be employed to replace the worn blade, and a guard to permit of cutting the beard or the like without marring the skin. For the purpose mentioned, use is made of a shank mounted to swing on a handle and foldable therein, a casing mounted on the shank, a clasp for removably securing the casing on the shank, a guard on the casing, and a blade for removable engagement with the casing.

Reference is to be had to the accompanying drawings constituting a part of this specification, in which similar characters of reference denote corresponding parts in all the views, and in which—

Figure 1 is a partial side elevation of my razor and showing the same in open position; Fig. 2 is an end view of my invention; Fig. 3 is a similar end view, but showing the guard removed from the casing; and Fig. 4 is a fragmentary enlarged sectional view, showing the means for removably holding the casing on the shank of the razor.

Referring more particularly to the drawings, I provide a shank 10, mounted to swing in a handle 11 and adapted to fold intermediate the sides of the handle. A handle or grip 12 is integrally formed at one end of the shank, as will be seen in Fig. 1. At the other end of the shank, a reduced portion 13 is formed, and mounted thereon is a spring clasp 14, having a flanged end or handle 15. A casing 16 is provided to slidably engage the shank, to partially inclose the same, and the said casing is removably held on the shank by the spring clasp 14, the said clasp being adapted to engage the upper side 17 of the casing. The casing 16 is adapted to fit snugly on the shank 10, and integrally formed on the casing in the side thereof and near the lower end, are oppositely disposed inwardly pressed lugs 18, extending longitudinally of the casing, and the said sides of the casing are provided with sufficient elasticity to permit of removably sliding therebetween a razor blade 19, provided with depressions adapted to receive the lugs 18. Thus it will be seen that a foldable razor is provided, having a removable casing and a removable blade.

When it is desired to employ the razor as a safety razor, a depending guard 20 is formed integral with the casing 16, as will be seen in Figs. 1 and 2, and the said guard is adapted to be disposed immediately adjacent one side of the blade and extending a short distance beyond the same. In order to provide a light, durable and serviceable guard, the same is provided with a plurality of transversely extending slots along one side thereof with the said slots extending from the longitudinal lower end of the guard upwardly and thus forming a plurality of guard teeth 21.

It will be understood that the casing can be removed at any time, and reversed, so that a razor for both right and left hand shaving is provided; and it will be further understood that my razor can be constructed with or without the guard 20.

Having thus described my invention, I claim as new and desire to secure by Letters Patent:—

1. A razor, comprising a handle, a shank mounted to swing on the handle and adapted to fold thereon, a casing on the shank, a spring clasp on the shank and engaging the casing to removably secure the same on the shank, inwardly-extending lugs on the casing and extending longitudinally thereof, and a grooved blade removably engaging the casing, the said lugs engaging in the said grooves in the blade.

2. A razor comprising a handle, a shank mounted to swing on the handle and adapted to fold thereon, a casing on the shank, a spring clasp secured to the shank and provided with a flanged end for engagement with the casing to removably secure the same on the shank, inwardly extending lugs integrally formed on the casing and extending longitudinally thereof, a blade removably engaging the casing, the said lugs engaging the blade to hold the same in the casing and a guard integrally formed on the casing on one side thereof.

In testimony whereof I have signed my name to this specification in the presence of two subscribing witnesses.

HENRY JOHN MILLER.

Witnesses:
 JAMES GEORY,
 EDWARD DE ARMAS.

Copies of this patent may be obtained for five cents each, by addressing the "Commissioner of Patents, Washington, D. C."